UNITED STATES PATENT OFFICE.

L. OTTO P. MEYER, OF NEWTOWN, CONNECTICUT.

IMPROVEMENT IN THE MANUFACTURE OF SAFETY-MATCHES.

Specification forming part of Letters Patent No. 101,641, dated April 5, 1870.

*To all whom it may concern:*

Be it known that I, L. OTTO P. MEYER, of Newtown, Fairfield county, and State of Connecticut, have invented certain new and useful Improvements in the Manufacture of Safety-Matches; and I do hereby declare that the following is a full and exact description of the said invention.

Prior to these improvements, Letters Patent of the United States, bearing date of June 25, 1867, for improvements in the manufacture of safety-matches were granted to me. Since the grant of said patent I have made various experiments for the purpose of making the safety-match more perfect in resistance to moisture, and my experiments finally have led to satisfactory results. For said purpose I have tried, by way of experiment, strong glues, also the best isinglass, instead of the gelatine named in my former patent as ingredient for the match compound, but without attaining the desired effect. I found, however, some of the strong glues sufficiently pure and good for mixing with my match compound, and of the advantage of being cheaper than the gelatine; but I give now the preference to French white gelatine of first quality. Said French gelatine very readily dissolves in water, and remains liquid at a low temperature; hence it is very easily mixed, and insures compactness of compound, but requires, perhaps more than any other gelatine, protection against moisture.

I am aware that, in the manufacture of some phosphorous matches, varnishes are employed for producing protecting coats against moisture; but varnishes made by solvents, as turpentine or similar highly-inflammable fluids, are objectionable, and although varnishes made by alcohol are less objectionable, still such varnishes are of little benefit to my match, since the coating cannot be done sufficiently thick without injuring the match in its inflammability on the prepared surfaces. Moreover, varnishes, if applied to my match, will cause smoke or smell, and their application to the compound of chlorate of potassa is objectionable.

In the course of my experiments, I have tried coating with wax, and in various ways, for the purpose of producing a perfect coat, and so thin as not to injure the inflammability of the match. By way of experiments I have subjected my safety-match (being manufactured as described in my former patent) to a heat sufficiently high to melt some of the wax attached to the stick, it being held in such position that the melted wax could run over the match compound and coat it; but this mode is not recommendable.

For the purpose of better securing the desired thinness of the wax coat, I made wax mixtures, of which I will name but the following:

No. 1.

| | |
|---|---|
| Rain-water | 87 |
| Bicarbonate of soda | 1 |
| White bees-wax | 12 |
| Parts by weight | 100 |

No. 2.

| | |
|---|---|
| Rain-water | 85.6 |
| Liquid silicate of soda, 39°B. | 2.4 |
| White bees-wax | 12.0 |
| Parts by weight | 100.0 |

No. 3.

| | |
|---|---|
| Rain-water | 85.5 |
| Bicarbonate of soda | 0.5 |
| Olive-oil or bees-wax | 3.5 |
| Paraffine-wax of 133° congealing-point. | 10.5 |
| Parts by weight | 100.0 |

The ingredients of the above mixtures, when heated to about 155° to 180° Fahrenheit, and then well shaken, will produce a milk of wax, applicable either cold or warm, for coating matches. Each mixture may have its *quantum* of water reduced or increased for producing a coat more thick or thinner.

After the matches have been dipped in said milk of wax, I dry them, first at a moderate heat, and afterward expose them for a few seconds to a heat sufficiently high to melt the deposited wax. However, the use of milk of wax for wax-coating matches is set aside by me since my success with a mode more simple and better in results.

My experiments finally enabled me to produce the best wax coat on matches by dipping them in molten wax. I tried for this mode different waxes—as, bees-wax, vegetable and mineral wax, stearic acid, and other wax-like substances, either simple or mixed, or compounded with fatty substances, or with a small percentage of rosin or balsam; but I found the very best result with pure paraffine-wax of about 133° Fahrenheit, congealing-point, (the same wax as is employed for the manufacture of candles.) Said paraffine-wax has no reaction on the match compound, produces no smoke or smell, burns bright, and has also the advantage over other waxes in point of cheapness.

For the process of dipping the matches in said paraffine-wax I tried the following conditions:

First, paraffine-wax heated from 136° to 230° Fahrenheit, but found the best results when it was heated only a few degrees above its congealing-point.

Second, the depth for immersion in molten wax from one-quarter to five-eighths of an inch; but I found one-half an inch depth the best, except in cases where the matches are heated as high as the temperature of the molten wax, which will cause the wax to rise on the sticks by capillary attraction. In such cases the matches are dipped no deeper than to allow the level of the molten wax to come just a little above the match compound.

Third, matches whose sticks were previously (before tipping with match compound) dipped in paraffine-wax, and matches whose sticks were not previously dipped in paraffine-wax, and I found the best result with matches whose sticks were not previously dipped in wax, but which were clean.

Fourth, perfectly dry matches, preparatory for the process of wax-coating, heated to from 60° to 200° Fahrenheit, but found the best result when they were heated from 80° to 142° Fahrenheit.

Fifth, the process of dipping in wax by one dip, or by two or three in succession, either all in highly-heated wax, or the first dip in highly-heated and the last dip in wax of low heat; but I found the best result with one dip.

Sixth, duration of time for immersion from a few seconds to about fifteen seconds, but found from five to eight seconds sufficient.

Seventh, wax-dipping pan constructed to concentrate hot air above the molten wax, but found a common dipping-pan answering just as well.

About the conditions above alluded to as found the best, greater precision will be found in the following table:

| Variation. | A. | B. | C. | D. | E. |
|---|---|---|---|---|---|
| Temperature of matches, in degrees of Fahrenheit | 80 | 90 | 100 | 110 | 140 |
| Temperature of the molten wax, in degrees Fahrenheit | 142 | 141 | 140 | 140 | 138 |
| Depth of wax in dipping-pan, in inches | $\frac{1}{2}$ | $\frac{1}{2}$ | $\frac{1}{2}$ | $\frac{1}{2}$ | $\frac{1}{4}-\frac{3}{8}$ |
| Duration of time for immersion in molten wax, in seconds | 8 | 7 | 7 | 6 | 5 |
| Temperature of atmosphere in dipping-room, or in proximity of dipping operation, in degrees Fahrenheit | 80 | 90 | 100 | 110 | 80–110 |

I prefer, as being the most convenient, the above-stated variation "B."

The air in the dipping-room ought to be dry, and I found it best that the temperature (at least in the proximity of the dipping operation) should not be below 80° Fahrenheit, but may be considerably higher. 90° Fahrenheit is preferred by me. A temperature from 80° to 110° will answer for properly cooling down the newly-coated matches.

As regards the wax-dipping pan, it may be heated to the required degrees by hot air or by hot water.

To keep up the desired temperature of the air or water for heating the dipping-pan and the supplying wax-melting pot, gas-flames will be found most suitable, as being easily adjusted.

To keep up the right height of wax in the dipping-pan during operation, a stream of molten wax of required temperature is to flow into the dipping-pan, and at the proper height in the dipping-pan there ought to be an aperture for the surplus wax to run off.

The mode of operation is as follows: The matches are immersed in the molten wax as deep as to touch the bottom of the pan. The withdrawing of the matches from the molten wax is to be done slowly. If it is done quickly, much surplus wax will adhere to the matches. As soon as the matches are fairly lifted out of the molten wax they require to be quickly turned over, so as to bring the match compound upward, and to remain in such position at least three to five seconds, in order that the surplus wax may not thicken on the match compound, but run down on the sticks.

The duration of time, as above stated, for immersion of matches in molten wax is to be counted from the moment the match-points enter the molten wax till they leave it. The time for it may be denoted by a striking-hammer worked by a mechanical movement.

For the mode of wax-coating matches by dipping in molten wax, the match-sticks require no previous dipping in wax, nor is it required, nor good in principle, to burn or charcoal the ends of the match-sticks.

Wax-coating the match compound and tipping the sticks with wax is done by one operation, saving labor, and causing the advantage that the match compound adheres firmer to the sticks, and that the match compound may be used more economically, and that higher temperature may be employed for hastening the drying of the match compound.

Although matches coated with wax by different ways may show no difference in outside appearance, still, if their quality be tested, the matches coated by molten wax, and in a manner as described above, will show great superiority over others.

As regards my match compound, no alteration is needed on account of coating with paraffine-wax; but by my experience of late years I am induced to make a few more remarks regarding the said compound.

The proportions of the ingredients for said compound are best limited to chlorate of potassa, forty-six to fifty-six per cent.; gelatine or glue, sixteen to twenty-three per cent.; pumice-stone, twenty-two to forty-two per cent.

Of all variations in the proportions of said compound, I consider as principal—

| Compound. | No. 1. | No. 2. | No. 3. | No. 4. |
|---|---|---|---|---|
| Chlorate of potassa | 56 | 56 | 52 | 46 |
| Gelatine or glue | 22 | 20 | 18 | 18 |
| Pumice-stone | 22 | 24 | 30 | 36 |
| Parts by weight | 100 | 100 | 100 | 100 |

I prefer now compound No. 3. The match compound may be colored as described in my former patent. To mix these ingredients, I dissolve the gelatine in a hot-water bath, having previously soaked the gelatine in cold water—if French gelatine, three parts of water to one part of gelatine; but the gelatines and glues found in market are not of equal dryness, and in order to get the match compound of correct proportions it is best to test the gelatine or glue as to their percentage of water. The gelatine employed by me, and of which I have above stated the proportions for the compound, if exposed to a dry heat of 212° Fahrenheit for three-quarters of an hour, loses twelve per cent.; if exposed to said heat for half an hour longer no further loss of weight is perceptible. If the gelatine or glue is thicker than one-twentieth of an inch, more time for drying may be required, till, in half an hour, no loss in weight of any account occurs. Only samples of the gelatine or glue need to be subjected to said test or drying process; and if the loss is more or less than twelve per cent., the proportions can get adjusted accordingly in order to produce the required consistency. The following table may be of some assistance.

In reference to percentage of water found in gelatine or glue, the proportions of gelatine or glue for my above stated match compound will be—

| For compound— | No. 1. | No. 2. | Nos. 3 and 4. |
|---|---|---|---|
| Gelatine containing fourteen per cent. water | 22.51 | 20.47 | 18.42 |
| Gelatine containing twelve per cent. water | 22.00 | 20.00 | 18.00 |
| Gelatine containing ten per cent. water | 21.51 | 19.56 | 17.60 |
| Gelatine containing eight per cent. water | 21.04 | 19.13 | 17.22 |
| Gelatine containing six per cent. water | 20.60 | 18.72 | 16.85 |
| Gelatine containing four per cent. water | 20.17 | 18.33 | 16.50 |
| Gelatine containing two per cent. water | 19.76 | 17.96 | 16.16 |
| Gelatine dried by above-described process | 19.36 | 17.60 | 15.84 |

That the match compound may be of a good compactness and have a good surface, and be most suitable for wax-coating, it is desirable that the tipping with match compound be done in a sufficiently warm room, or that the dipping-pan be warmed in order to keep the match compound in a good melted condition. Directly after the matches have been tipped with match compound they may be exposed to a temperature of about 100° to 120° Fahrenheit for about half an hour; and then, for hastening the process of drying, they may be exposed to a higher temperature—up to about 200° Fahrenheit. The whole drying process may be done in about one hour; but matches whose sticks, previously to tipping with match compound, have been dipped in wax cannot be exposed to such high heat, else the previously tipping with wax will be wasted or injured. The matches tipped with match compound and dried, and at the proper temperature, are to be dipped in molten wax, as described above, while they are yet in the dipping-frames.

I do not claim to have invented a new varnish or coating; but I claim that the various modes heretofore described and set forth for coating safety-matches with wax are new and useful in the manufacture of said matches. I do not embrace in my claim for a patent the application of said improvements to the manufacture of any other matches, but only to safety-matches manufactured under Hyerpe's and my said Letters Patent of the United States.

Having fully described my invention, what I claim, and desire to secure by Letters Patent of the United States, subordinate to Hyerpe's and my herebefore-said Letters Patent, is—

Certain modes of coating safety-matches, substantially as herein described, and for the purpose herein set forth.

L. OTTO P. MEYER.

Witnesses:
HENRY SANFORD,
ELI C. BARNUM.